US009895780B2

(12) United States Patent
Niidoi et al.

(10) Patent No.: US 9,895,780 B2
(45) Date of Patent: Feb. 20, 2018

(54) COMBINED WORKING MACHINE AND COMBINED WORKING METHOD

(71) Applicant: DMG MORI CO., LTD., Nara (JP)

(72) Inventors: Hideo Niidoi, Kanagawa (JP); Noriaki Nakayama, Kanagawa (JP)

(73) Assignee: DMG MORI CO., LTD., Nara (JP)

( * ) Notice: Subject to any disclaimer, the term of this patent is extended or adjusted under 35 U.S.C. 154(b) by 55 days.

(21) Appl. No.: 14/427,176

(22) PCT Filed: Oct. 11, 2013

(86) PCT No.: PCT/JP2013/077794
§ 371 (c)(1),
(2) Date: Mar. 10, 2015

(87) PCT Pub. No.: WO2014/065137
PCT Pub. Date: May 1, 2014

(65) Prior Publication Data
US 2015/0239081 A1   Aug. 27, 2015

(30) Foreign Application Priority Data
Oct. 24, 2012   (JP) ................ 2012-234355

(51) Int. Cl.
*B23P 23/02*   (2006.01)
*B23Q 39/00*   (2006.01)
*B23Q 39/02*   (2006.01)

(52) U.S. Cl.
CPC ............ *B23P 23/02* (2013.01); *B23Q 39/026* (2013.01); *B23Q 2039/006* (2013.01);
(Continued)

(58) Field of Classification Search
CPC .............. B23B 3/16; B23B 3/168; B23B 3/22
See application file for complete search history.

(56) References Cited

U.S. PATENT DOCUMENTS 3,680,267 A * 8/1972 Vale ............... B24B 41/005
                                              451/335
5,885,199 A * 3/1999 Shao .............. B23F 17/006
                                              29/27 C
(Continued)

FOREIGN PATENT DOCUMENTS

CN         1491764         4/2004
CN        200963744       10/2007
(Continued)

OTHER PUBLICATIONS

Machine Translation of Patent EP123956A2.*
International Search Report with English-language translation for PCT/JP2013/077794 dated Nov. 12, 2013.

Primary Examiner — Monica Carter
Assistant Examiner — Lauren Beronja
(74) Attorney, Agent, or Firm — Greenblum & Bernstein, P.L.C.

(57) ABSTRACT

A combined working machine includes a base frame having a sloped surface, a first headstock installed on the sloped surface, a first main spindle rotatably provided on the first headstock, a second headstock installed on the sloped surface oppositely to the first headstock, a second main spindle provided on the second headstock, a tool head installed on the sloped surface on one side of the first headstock, a tool head provided in the tool head and having a tool attachment base to which a cutting tool is attached, a grinding head installed on the sloped surface on another side of the first headstock, and a grinding head body provided in the grinding head and supports a rotatable rotary shaft. A grinding wheel for grinding is exchangeably attached to the rotary shaft of the grinding head. According to the combined working machine, cutting and grinding can be carried out concurrently.

8 Claims, 9 Drawing Sheets

(52) U.S. Cl.
CPC .. *B23Q 2039/008* (2013.01); *B23Q 2230/006* (2013.01); *Y10T 29/511* (2015.01)

(56) References Cited

U.S. PATENT DOCUMENTS

2002/0033082 A1* 3/2002 Nakaminami .......... B23B 3/167
                                                                82/117
2004/0074073 A1    4/2004  Shingai et al.

FOREIGN PATENT DOCUMENTS

| EP | 0123956 A2 * | 11/1984 | ............... B24B 5/01 |
|---|---|---|---|
| JP | 4-365525 | 12/1992 | |
| JP | 5-12051 | 2/1993 | |
| JP | 5-162002 | 6/1993 | |
| JP | 10-156721 | 6/1998 | |
| JP | 11138434 A * | 5/1999 | |
| JP | 2007-61937 | 3/2007 | |
| JP | 2008-23611 | 2/2008 | |

* cited by examiner

COMBINED WORKING MACHINE AND COMBINED WORKING METHOD

TECHNICAL FIELD

The present invention relates to a combined working machine in which a lathe for cutting a workpiece held by a rotatable main spindle of a headstock and a grinder for grinding the workpiece are combined with each other, and to a combined working method.

BACKGROUND ART

There is a case where a workpiece is cut by a lathe and is ground by a grinder. In this case, it is needed to move the workpiece from the lathe to the grinder, and holding the workpiece on the lathe and holding of the workpiece on the grinder are needed independently from each other. Therefore, since the workpiece is worked by the plural working machine, a detention time between the works becomes long. In addition, since it is needed to hold it on the plural working machines independently, it becomes hard to match working references and thereby working accuracy easily degrades.

Therefore, a patent Document 1 listed below discloses a combined working machine that can cut and grind a workpiece that is held.

PRIOR ART DOCUMENT

Patent Document

Patent Document 1: Japanese Utility Model Application Publication No. H5-12051

SUMMARY OF INVENTION

In the combined working machine disclosed in the Patent Document 1, a headstock whose rotatable left-side main spindle is provided horizontally is disposed on a sloped surface of a bed movably along a Z-axis direction (an axial direction of the main spindle). In addition, a right-side headstock opposed to the left-side headstock is also disposed on the sloped surface of the bed movably along the Z-axis direction. Tool heads movable along the Z-axis are provided on the sloped surface above and beneath the left-side headstock, respectively. Similarly, grinding heads movable along the Z-axis are provided on the sloped surface above and beneath the right-side headstock, respectively. In addition, a partitioning plate is provided between the left-side headstock and the right-side headstock in order to separate a working area for the tool heads and a working area for the grinding heads.

In the above combined working machine, a workpiece is cut at the working area for the tool heads, and then moved to the working area for the grinding heads. Therefore, it is impossible to cut and grind the workpiece concurrently and it is hard to improve efficiency of a finishing work.

Therefore, an object of the present invention is to provide a combined working machine and a combined working method that can cut and grind a workpiece concurrently and thereby improve efficiency of a finishing work.

A first aspect of the present invention provides a combined working machine that can carry out cutting and grinding, the machine comprising: a base frame that has a sloped surface; a first headstock that is installed on the sloped surface; a first main spindle that is provided on the first headstock horizontally and rotatably, and holds a base end of a workpiece; a second headstock that is installed on the sloped surface so as to opposed to the first headstock; a second main spindle that is provided on the second headstock movable in a Z-axis direction that is an axial direction of the first main spindle and an X-axis direction that is perpendicular to the Z-axis and parallel to the sloped surface, and is capable of holding a distal end of the workpiece or an base end of another workpiece; a tool head that is installed on the sloped surface on one side of the first headstock; a tool head body that is provided in the tool head movably in the X-axis direction and the Z-axis direction, and has a tool attachment base to which a cutting tool is attached exchangeably; a grinding head that is installed on the sloped surface on another side of the first headstock; and a grinding head body that is provided in the grinding head movably in the X-axis direction and the Z-axis direction, and supports a rotary shaft that is rotatable and inclined to both of the X-axis direction and the Z-axis direction, wherein a grinding wheel for grinding is exchangeably attached to the rotary shaft of the grinding head.

It is preferable that the tool attachment base of the tool head is a tool attachment wheel, and the tool attachment wheel is provided on the tool head body movably in a Y-axis direction that is perpendicular to both of the X-axis direction and the Z-axis direction.

It is preferable that the second headstock includes a tailstock, and the tailstock has a center that supports a distal end of the workpiece.

Here, it is further preferable that the tailstock is movable in the Z-axis direction, and has a center holder to which the center is exchangeably attached, the center holder has a push rod that is slidable in the Z-axis direction and pushes the center out from the center holder, and the tailstock has an actuator that slides the push rod.

In addition, it is preferable that the first headstock has a dresser for dressing of the grinding wheel, and a dresser for dressing of a grinding stone of a grinding unit attached to the tool head.

In addition, it is preferable that the second headstock has a dresser for dressing of a grinding stone of a grinding unit attached to the tool head.

In addition, it is preferable that the grind head body has a safety cover on which a cutout for exposing a portion of the grinding wheel is formed, and the safety cover has a shutter that closes the cutout.

A second aspect of the present invention provides a combined working method of a workpiece by using a combined working machine according to the above first aspect, comprising: cutting the workpiece held by the first main spindle by a cutting tool attached to the tool head, and, concurrently, grinding the workpiece by the grinding wheel.

DESCRIPTION OF EMBODIMENTS

Figure 1:
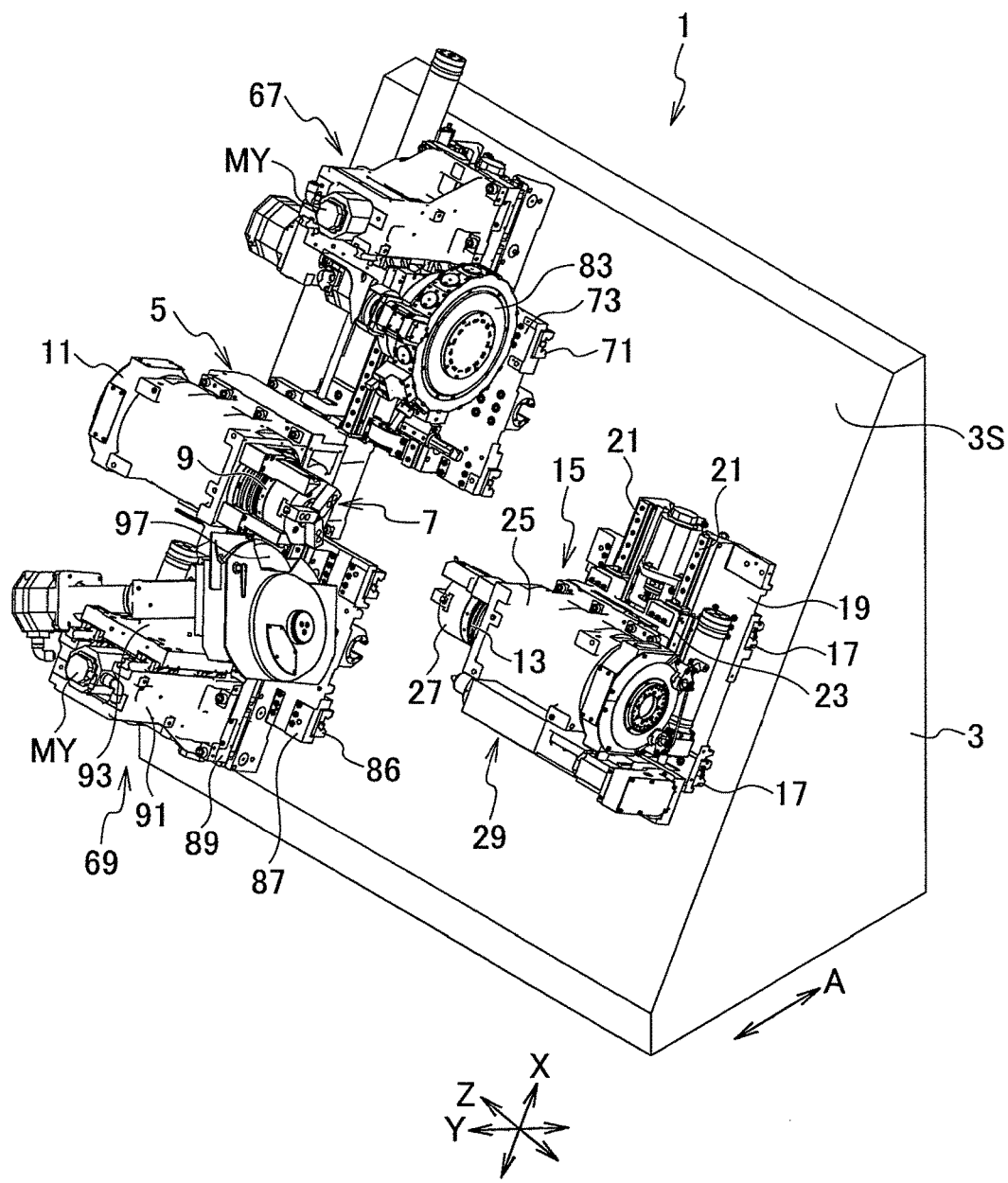
FIG. 1 It is a perspective view of a combined working machine according to an embodiment.

A combined working machine 1 according to an embodiment will be described with reference to the drawings. As shown in FIG. 1, the combined working machine 1 includes a base frame 3. The base frame 3 has a sloped surface 3S sloped by almost 75° to a horizontal plane. The sloped surface 3S is an installation surface on which headstocks and so on are installed. A first headstock 5 is fixed on the installation surface (sloped surface) 3S at a middle level along a height direction. The first headstock 5 includes a rotatable first main spindle 9. A direction along a rotational axis of the first main spindle 9 (a Z-axis direction) is a horizontal direction. A chuck 7 (e.g. a scroll chuck) is provided at one end of the first main spindle 9 in the Z-axis.

The first main spindle 9 is rotated by a motor 11 (e.g. a servo motor or a spindle motor). Therefore, the first main spindle 9 is rotated from its rotational reference position, and can be stopped at a desired rotational position to the rotational reference position. Namely, a working position on a workpiece held by the first main spindle 9 can be set at a desired position.

A second headstock 15 is installed on the sloped surface (installation surface) 3S of the base frame 3 so as to be opposed to the first headstock 5. The second headstock 15 includes a rotatable second main spindle 13. Namely, the second main spindle 13 is opposed to the first main spindle 9 of the first headstock 5. The second headstock 15 includes Z axis guide members (guide rails: not shown in the drawings) fixed at a position opposed to the first headstock 5 on the sloped surface 3S, a Z-axis slider 19 provided on the Z-axis guide members slidably in the Z-axis direction, X-axis guide members (guide rails) 21 provided fixedly on the Z-axis slider 19, and an X-axis slider 23 provided on the X-axis guide members 21 slidably in an X-axis direction (a direction perpendicular to the Z-axis direction and parallel to the sloped surface 3S). Guide carriages 17 that slide along the Z-axis guide members (guide rails) are attached to a bottom surface of the Z-axis slider 19.

The above-described second main spindle 13 is provided on the X-axis slider 23, and is rotated by a motor 25 (e.g. a servo motor or a spindle motor) installed on the X-axis slider 23. A chuck 27 that is similar to the chuck 7 of the first main spindle 9 is provided at an opposed end of the second main spindle 13 to the first main spindle 9. Note that a position of the Z-axis slider 19 along the Z-axis direction or a position of the X-axis slider 23 along the X-axis direction is set by a servo mechanism (not shown in the drawings) configured of a servo motor, a ball screw and so on. Therefore, a position of the second main spindle 13 can be set arbitrarily along the Z-axis direction and the X-axis direction.

Figure 2:
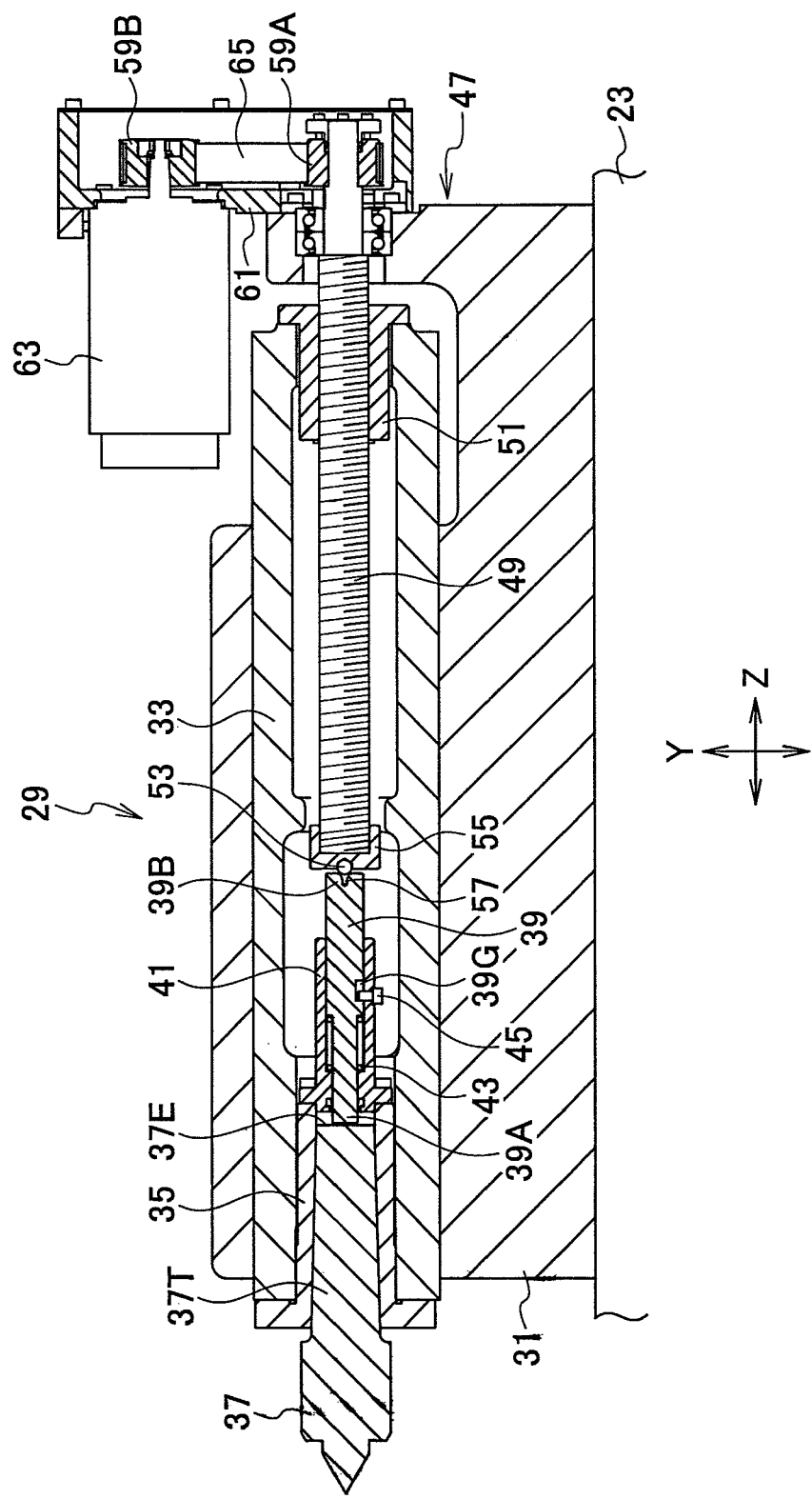
FIG. 2 It is a cross-sectional view showing a tailstock of the combined working machine.

In addition, a tailstock 29 is fixed on the X-axis slider 23. The tailstock 29 supports an end surface of a long workpiece held by the first main spindle 9. As shown in FIG. 2, a tailstock body 31 of the tailstock 29 is fixed on the X-axis slider 23. A quill 33 is provided on the tailstock body 31 slidably in the Z-axis direction. The tailstock body 31 is distanced from the second main spindle 13 along the X-axis direction, but a height of the quill 33 along a Y-axis direction is equal to a height of the second main spindle 13 along the Y-axis direction.

A tapered sleeve (center holder) 35 is fixed at an opposed end of the quill 33 to the first main spindle 9. A tapered shank 37T of a center 37 is taper-engaged with the tapered sleeve 35. A push rod 39 for pushing the center 37 out from the tapered sleeve 35 is provided at a base end of the tapered sleeve 35 slidably in the Z-axis direction.

A guide sleeve 41 is attached to a base end of the tapered sleeve 35, and the push rod 39 is inserted into the guide sleeve 41 slidably in the Z-axis direction. The push rod 39 is always urged by an elastic member (a coil spring) 43 in the guide sleeve 41 so as to be distanced from a base end surface 37e of the center 37. In addition, in order to prevent the push rod 39 from being pulled out from the guide sleeve 41, a slot 39G is formed on the push rod 39, and a stopper screw 45 is attached to the guide sleeve 41.

A slide mechanism 47 is provided on the tailstock body 31 in order to slide the quill 33 in the Z-axis direction and to push the center 37 out from the tapered sleeve 35 by the push rod 39. The slide mechanism 47 is driven by an actuator (a motor 63). The slide mechanism 47 includes a rotatable screw spindle 49 extended in the Z-axis direction. The screw spindle 49 is threaded with a spindle nut 51 that is fixed with the quill 33. A steel ball 53 is attached to a distal end of the screw spindle 49.

A cap 55 having the steel ball 53 at its center is fixed at the distal end of the screw spindle 49. A hole 57 to be contacted with the steel ball 53 is formed on a base end surface of the push rod 39. Therefore, even while the screw spindle 49 rotates, contact friction between the steel ball 53 (the screw spindle 49) and the hole 57 (the push rod 39) is reduced. Note that a thrust bearing may be provided at the distal end of the screw spindle 49 or at the base end of the push rod 39 in order to reduce contact friction between the screw spindle 49 and the push rod 39.

The slide mechanism 47 also includes the actuator (the motor 63) for rotating the screw spindle 49. A pulley 59A is fixed at a base end of the screw spindle 49. In addition, a pulley 59B is fixed with an output shaft of the motor 63 (a servo motor: a rotary actuator) installed on a motor bracket 61 fixed with the tailstock body 31. An endless belt 65 (a timing belt) is wound around a pair of the pulleys 59A and 59B of the slide mechanism 47.

Therefore, when the screw spindle 49 is rotated by the motor 63, the quill 33 is slid in the Z-axis direction. When the screw spindle 49 is rotated forward, the quill 33 is slid leftward in FIG. 2 via the nut 51 (the quill 33 is protruded from the tailstock body 31). As the result, by pressing the center 37 attached to the quill 33 onto a center of an end surface of a workpiece held by the first main spindle 9, an end of the workpiece is supported rotatably by the center 37.

On the other hand, when the screw spindle 49 is rotated reversely, the quill 33 is slid rightward in FIG. 2 via the nut 51 (the quill 33 is retracted into an inside of the tailstock body 31). If the screw spindle 49 is further rotated reversely after the distal end of the screw spindle 49 and the base end of the push rod 39 are contacted with each other, the quill 33 is slid rightward further and thereby the push rod 39 is slid toward the center 37 by the screw spindle 49. As the result, the center 37 is pushed out (removed) from the tapered sleeve 35 by the push rod 39.

Therefore, in the tailstock 29, when the center 37 is moved so as to be distanced away from the first main spindle 9, the center 37 is pushed out from the tapered sleeve 35 at its movement end. Namely, the center 37 can be easily removed. Note that the slide mechanism 47 for sliding the quill 33 in the Z-axis direction is not limited to the above-described mechanism. For example, the slide mechanism 47 may be configured by utilizing a fluid pressure cylinder. In addition, a cutting tool (e.g. a drill) may be installed to the tapered sleeve 35, instead of the center 37. In this case, it becomes possible to cut a workpiece held by the first main spindle 9.

In addition, as shown in FIG. 1, a tool head 67 to which cutting tools for cutting a workpiece held by the first main spindle 9 of the first headstock 5 (or the second main spindle 13 of the second headstock 15) is attached, is also installed on the installation surface (sloped surface) 3S of the base frame 3. Further, a grinding head 69 for grinding a workpiece is also installed on the installation surface (sloped surface) 3S. The tool head 67 is arranged on one side (an upper side) of the first headstock 5, and the grinding head 69 is arranged on another side (a lower side) of the first headstock 5. Note that the tool head 67 and the grinding head 69 may be arranged reversely.

Figure 3:
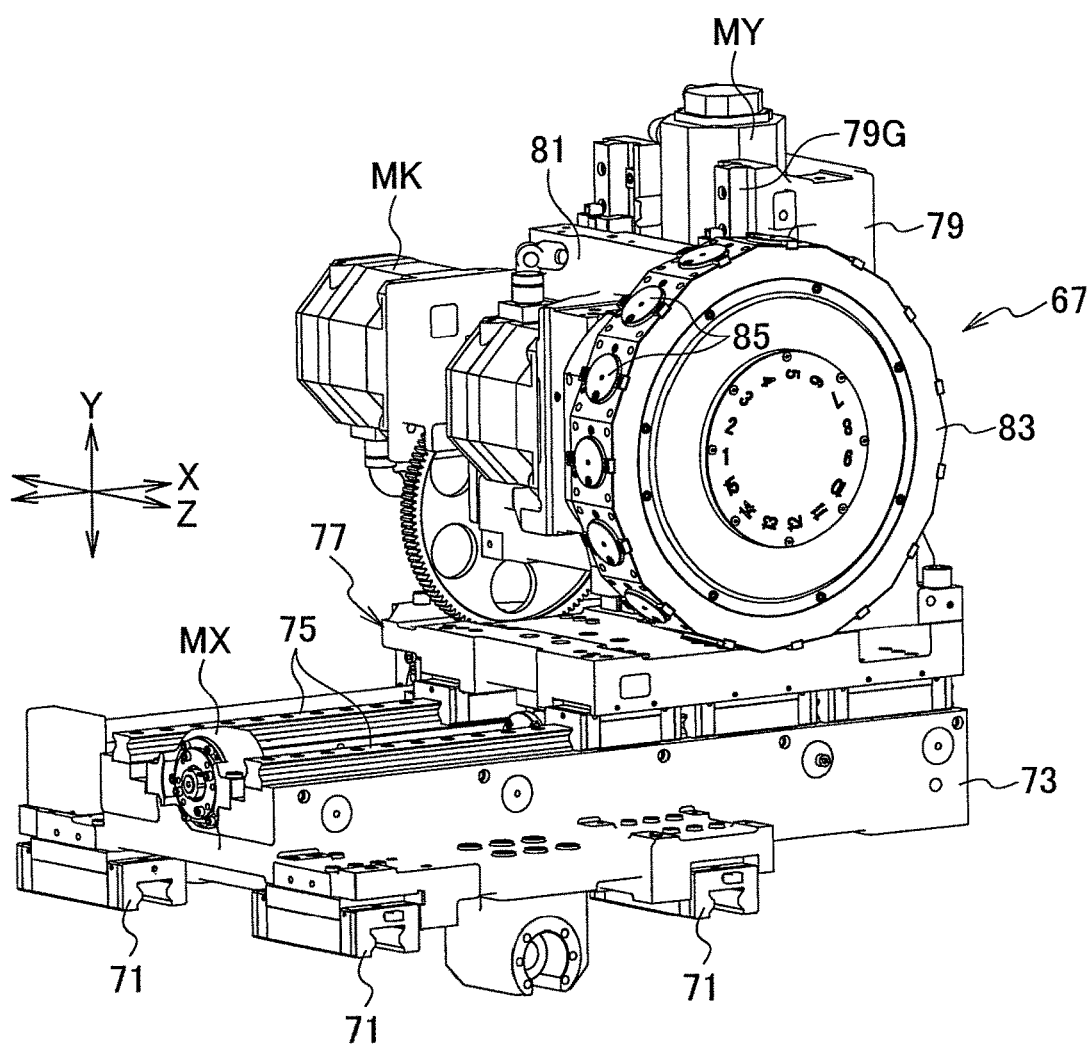
FIG. 3 It is a perspective view of a tool head of the combined working machine.

As shown in FIG. 1 and FIG. 3, the tool head 67 in the present embodiment is a turret tool head. The tool head 67 includes Z-axis guide members (guide rails: not shown in the drawings) fixed on the installation surface 3S, a Z-axis slider 73 provided on the Z-axis guide members slidably in the Z-axis direction, X-axis guide members (guide rails) 75 provided fixedly on the Z-axis slider 73, and an X-axis slider 77 provided on the X-axis guide members 75 slidably in the X-axis direction. Guide carriages 71 that slide along the Z-axis guide members (guide rails) are attached to a bottom surface of the Z-axis slider 73. A position of the Z-axis slider 73 is set by a servo mechanism (not shown in the drawings) configured of a servo motor, a ball screw and so on. Therefore, the position of the Z-axis slider 73 can be set arbitrarily along the Z-axis direction.

A position of the X-axis slider 77 is also set by a servo mechanism configured of a servo motor MX, a ball screw (not shown in the drawings) and so on. Therefore, a position of the X-axis slider 77 relative to the Z-axis slider 73 can be set arbitrarily along the X-axis direction. In addition, a guide post 79 extended in the Y-axis direction is provided on the X-axis slider 77. A tool head body 81 that is slidable in the Y-axis direction is attached to guide rails 79G provided on the guide post 79. A position of the tool head body 81 along the Y-axis direction can be set arbitrarily by a servo mechanism provided with a servo motor MY.

A turret shaft extending in the Z-axis direction is provided rotatably on the tool head body 81. The turret shaft is rotated by a servo motor MK provided on the tool head body 81. A tool attachment wheel (a tool attachment base) 83 is fixed at an end of the turret shaft. Plural tool mounts 85 are provided on an outer circumferential surface of this tool attachment wheel 83. A cutting tool (a drill, a milling cutter or the like) or a grinding tool (a grinding stone unit including a grinding stone provided with a shaft, or the like) can be installed to each of the tool mounts 85.

Therefore, in the tool head 67, in order to cut or grind a workpiece held by the first main spindle 9 (and/or the second main spindle 13), a tool attached to the tool attachment wheel 83 can be set at a position for working the workpiece. Then, the tool of the tool head 67 can be moved along the X-axis direction, the Y-axis direction and the Z-axis direction. By moving the tool of the tool head 67 in the Y-axis direction, it becomes possible to carry out D-cutting on an outer circumferential surface of a round shaft (workpiece) held by the first main spindle 9 (see a flat portion(s) D, shown in FIG. 6, whose cross-sectional shape is a D-shape).

Note that D-cutting is working for forming a flat surface parallel to a shaft center of a round shaft on an outer circumferential surface of the round shaft (working for forming a plat portion whose cross-sectional shape is a D-shape). For example, in the combined working machine disclosed in the above-mentioned Patent Document 1, its tool head and its grinding head can be moved in a Z-axis direction and an X-axis direction, but cannot move in a Y-axis direction. Therefore, D-cutting cannot be carried out by the combined working machine disclosed in the Patent Document 1.

Figure 4:
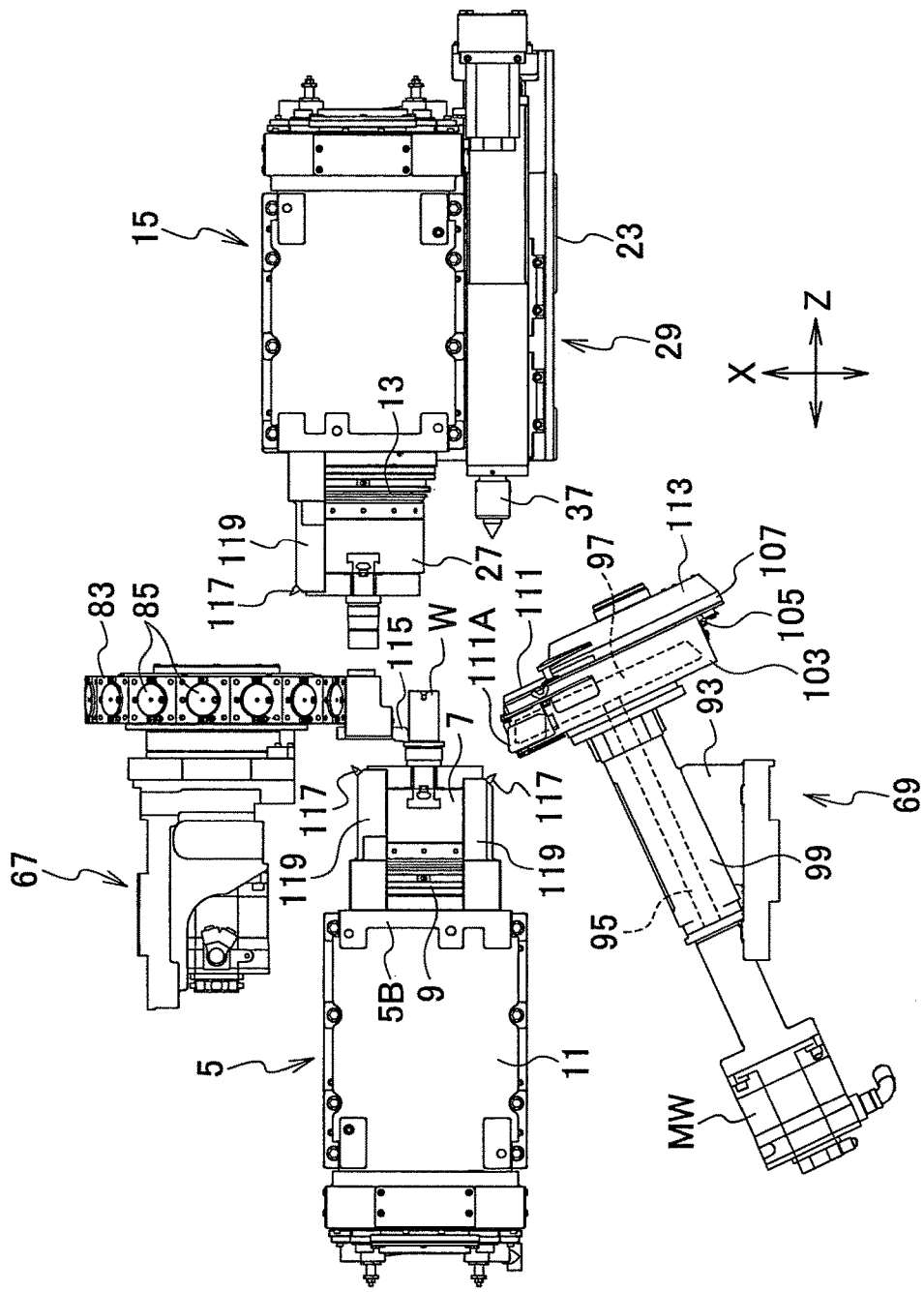
FIG. 4 It is an arrangement plan view showing a first headstock, a second headstock, the tool head and a grinding head of the combined working machine.

As described above, the grinding head 69 is arranged on the other side of the first headstock 5. As shown in FIG. 1 and FIG. 4, the grinding head 69 includes Z-axis guide members (guide rails: not shown in the drawings) fixed on the installation surface 3S, a Z-axis slider 87 provided on the Z-axis guide members slidably in the Z-axis direction, X-axis guide members (guide rails: not shown in the drawings) provided fixedly on the Z-axis slider 87, and an X-axis slider (a movable base) 89 provided on the X-axis guide members slidably in the X-axis direction. Guide carriages 86 that slide along the Z-axis guide members (guide rails) are attached to a bottom surface of the Z-axis slider 87. A position of the Z-axis slider 87 is set by a servo mechanism (not shown in the drawings) configured of a servo motor, a ball screw and so on. Therefore, the position of the Z-axis slider 87 can be set arbitrarily along the Z-axis direction.

A position of the X-axis slider 89 is also set by a servo mechanism (not shown in the drawings) configured of a servo motor, a ball screw and so on. Therefore, a position of the X-axis slider 89 relative to the Z-axis slider 87 can be set arbitrarily along the X-axis direction. In addition, a guide post 91 extended in the Y-axis direction is provided on the X-axis slider 89. A grinding head body 93 that is slidable in the Y-axis direction is attached to the guide post 91. A position of the grinding head body 93 along the Y-axis direction can be set arbitrarily by a servo mechanism provided with a servo motor MY. In addition, a rotary shaft 95 inclined to both of the X-axis direction and the X-axis direction is provided on the grinding head body 93. A grinding wheel 97 is exchangeably attached to a distal end of the rotary shaft 95.

A shaft support cylinder 99 for supporting the rotary shaft 95 rotatably is also provided on the grinding head body 93. A servo motor MW for the grinding wheel 97 is also installed on the grinding head body 93, and an output shaft of the servo motor MW is coupled with the rotary shaft 95. A safety cover 103 for covering the grinding wheel 97 is provided at a distal end of the shaft support cylinder 99.

Figure 5:
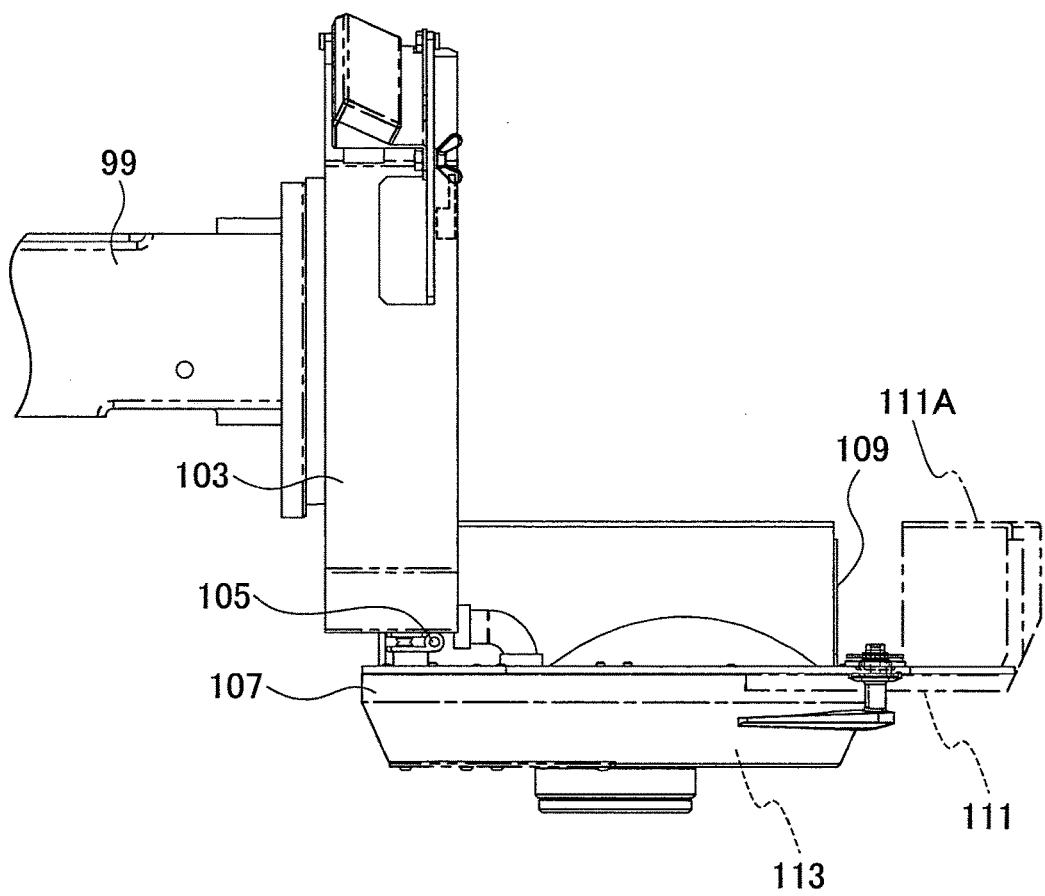
FIG. 5 It is a plan view showing a state where a safety cover for a grinding wheel of the grinding head is opened.
Figure 6:
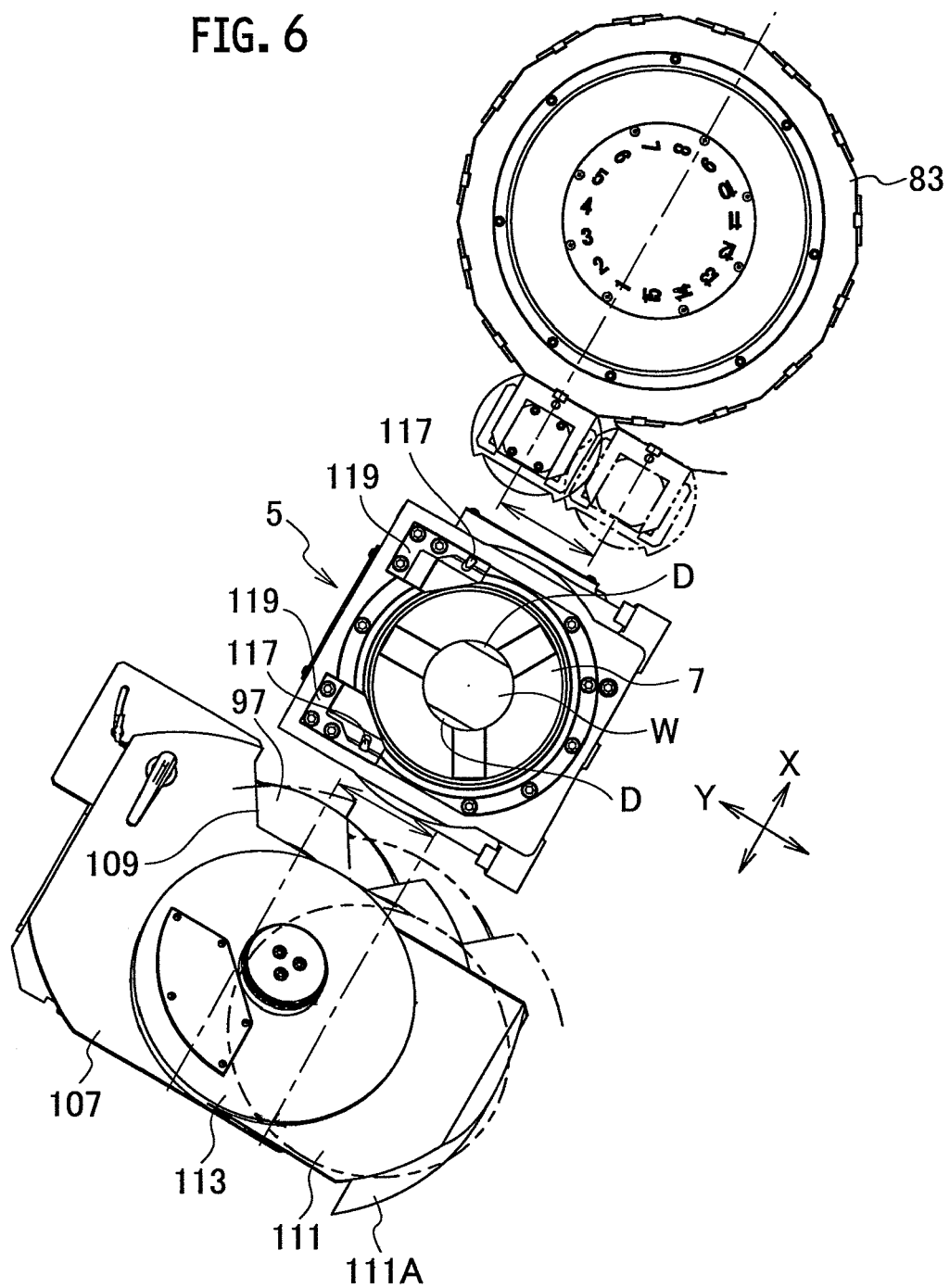
FIG. 6 It is a side view showing a concurrent work by a work tool of the tool head and the grinding wheel of the grinding head.

A protect cover 107 that is opened or closed via a hinge 105 is attached to the safety cover 103. A cutout for exposing the grinding wheel 97 is formed on the safety cover 103, and a cutout 109 for exposing the grinding wheel 97 is formed also on the protect cover 107 as shown in FIG. 6. In addition, a shutter 111 for closing an opening formed by the cutout of the safety cover 103 and the cutout 109 of the protect cover 107, is also provided. FIG. 5 shows a state where the protect cover 107 is opened. The protect cover 107 is opened when exchanging the grinding wheel 97. During grinding by the grinding wheel 97, the protect cover 107 is closed and only the shutter 111 is opened.

A rotational cover 113 having a rotational center eccentric to the rotary shaft 95 in the Y-axis direction, is provided on the protect cover 107. The rotational cover 113 is provided with the above-mentioned flat shutter 111. A flange 111A for closing the cutout of the safety cover 103 is extended along the Z-axis direction from an end edge of the shutter 111. A rotation of the rotational cover 113 is done by an actuator (not shown in the drawings).

As shown in FIG. 4, in a case where swarf generated when working a workpiece W held by the first main spindle 9 by a tool 115 of the tool head 67 falls over the grinding wheel 97, the opening (the cutout 109) of the safety cover 103 and the protect cover 107 is closed by the shutter 111 to prevent the swarf from attaching to the grinding wheel 97. Therefore, it is possible to protect the grinding wheel 97 from the swarf generated by the tool 115 on the tool attachment wheel 83.

FIG. 4 shows an arrangement of the first headstock 5, the second headstock 15, the tool head 67 and the grinding head 69 on an X-Z plane. The position of the first headstock 5 is fixed, a workpiece W held by the first main spindle 9 is rotated at a fixed position. The second main spindle 13 and the center 37 of the second headstock 15 are movable in the X-axis direction and the Z-axis direction, and the positions of the second main spindle 13 and the center 37 can be set arbitrarily to the position of the workpiece W (two dimensional X-Z coordinate). Therefore, a distal end of the workpiece W held by the first main spindle 9 can be held by the second main spindle 13, or can be supported by the center 37.

The tool attachment wheel 83 of the tool head 67 is movable in the X-axis direction, the Y-axis direction and the Z-axis direction. A position of a tool installed on the tool mount 85 of the tool attachment wheel 83 is set arbitrarily to a position of a workpiece W (three dimensional XYZ coordinate). Therefore, the workpiece W held by the first main spindle 9 (and/or the second main spindle 13) is worked by the tool installed on the tool mount 85. The grinding wheel 97 of the grinding head 69 is also movable in the X-axis direction, the Y-axis direction and the Z-axis direction. Therefore, the workpiece W held by the first main spindle 9 (and/or the second main spindle 13) is ground by the grinding wheel 97.

Note that a grinding stone of a grinding unit (not shown in the drawings) installed on the tool attachment wheel 83 or the grinding wheel 97 needs dressing periodically. Therefore, each of the first headstock 5 and the second headstock 15 is provided with a dresser(s) in order to carry out dressing for the grinding stone of the grinding unit or the grinding wheel 97 easily.

As shown in FIG. 4 and FIG. 6, the first headstock 5 includes a dresser holder 119 having a dresser 117 on one side (an upper side) along the X-axis direction relative to an axial center (the chuck 7) of the first main spindle 9, and includes a dresser holder 119 having a dresser 117 also on another side (a lower side). Each of the dresser holders 119 is fixed with a bracket 5B attached to the first headstock 5. Each position of the dressers 117 is located higher along the Y-axis direction than the axial center of the first main spindle 9, and is located outward from the chuck 7. Each distal end of the dressers 117 is located almost the same position along the Z-axis direction to a position of an end surface of the chuck 7. In addition, as shown in FIG. 4, each of the dressers 117 is directed outward along the X-axis direction so as to be got away from the axial center (the chuck 7) of the first main spindle 9.

A dresser 117 of the second headstock 15 is disposed symmetrically to one of the dressers 117 of the first headstock 5. Therefore, a redundant explanation for the dresser 117 of the second headstock 15 will be omitted.

Dressing for a grinding stone installed on the tool attachment wheel 83 of the tool head 67 can be carried out by the dresser 117 of the first headstock 5 disposed on a side of the tool head 67, or by the dresser 117 of the second headstock 15. On the other hand, dressing for the grinding wheel 97 of the grinding head 69 can be carried out by the dresser 117 of the first headstock 5 disposed on a side of the grinding head 69.

As described above, each position of the dressers 117 is located higher along the Y-axis direction than the axial center of the first main spindle 9 (the second main spindle 13) along the Y-axis, and is located outward from the chuck 7 of the first main spindle 9 (the chuck 27 of the second main spindle 13). Therefore, the grinding stone or the grinding wheel 97 never contacts with a workpiece held by the chuck 7 (27).

Namely, it is not needed to evacuate the dresser(s) 117 during working on a workpiece W while holding it by the chuck 7 (27). Therefore, the dresser(s) 117 can be provided with a simple configuration, and thereby it becomes possible to carry out dressing for the grinding stone or the grinding wheel 97 easily at a desired timing. As the result, it becomes possible to carry out working on a workpiece W with high accuracy.

Figure 7:
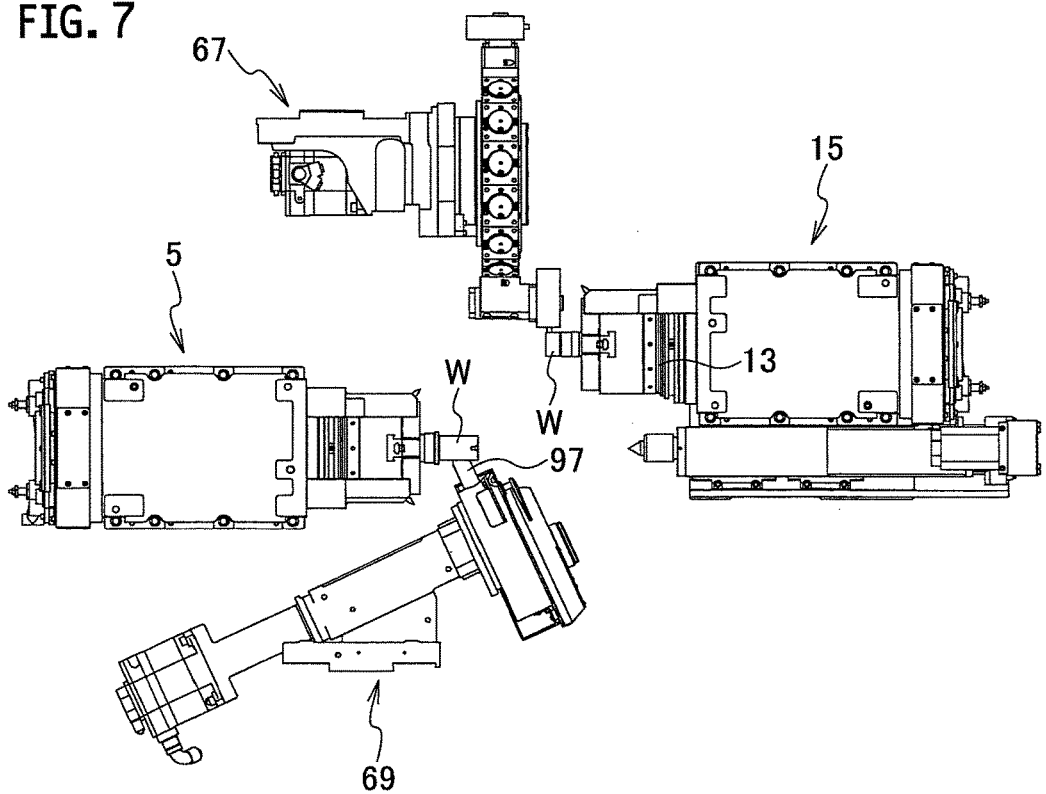
FIG. 7 It is a plan view showing a first mode of working on a workpiece by the work tool and working on a workpiece by the grinding wheel.

As shown in FIG. 7, a workpiece W held by the first main spindle 9 can be ground by the grinding wheel 97, and, concurrently, a workpiece W held by the second main spindle 13 can be worked by a tool of the tool head 67. Therefore, it is possible to carry out a first work on a workpiece W by the first headstock 5 and then carry out a second work on the workpiece W by the second headstock 15 after moving the workpiece W to the second headstock 15. Since the first work and the second work can be carried our concurrently, working efficiency can be improved.

Figure 8:
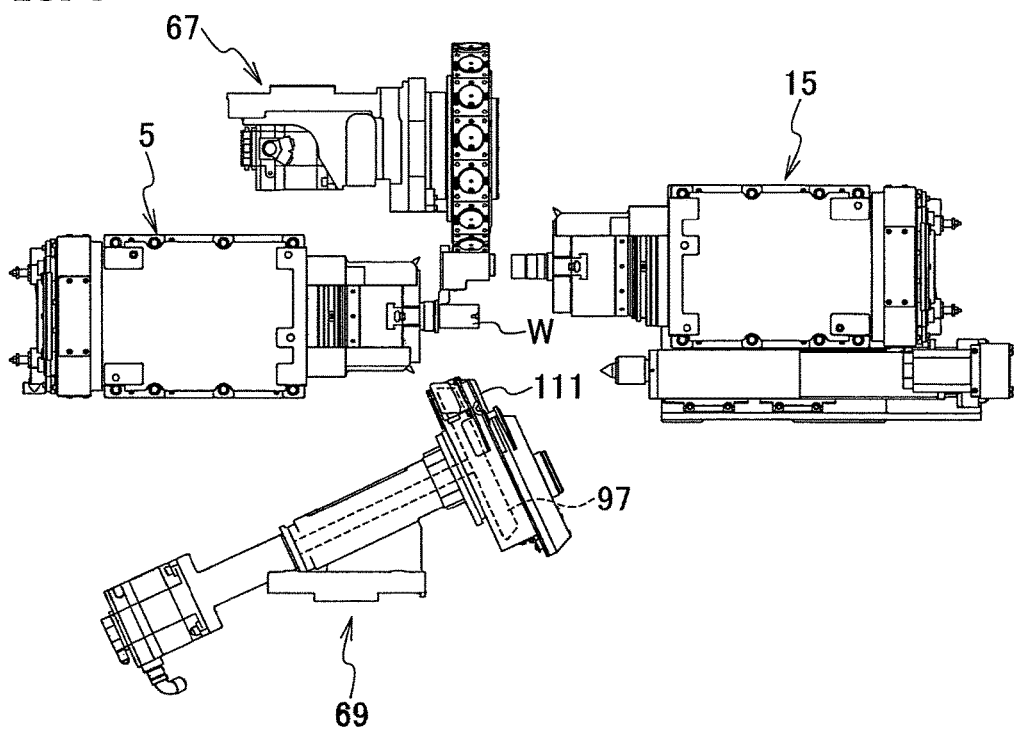
FIG. 8 It is a plan view showing a second mode of working on a workpiece by the work tool and working on a workpiece by the grinding wheel.

As shown in FIG. 8, when working a workpiece W held by the first main spindle 9 (or the second main spindle 13) by a tool of the tool head 67, the grinding wheel 97 can be covered by the shutter 111. Therefore, it becomes possible to prevent swarf generated when working the workpiece W by the first main spindle 9 (or the second main spindle 13) from falling over the grinding wheel 97. Namely, the grinding wheel 97 can be protected while the grinding wheel 97 is not used for working.

Figure 9:
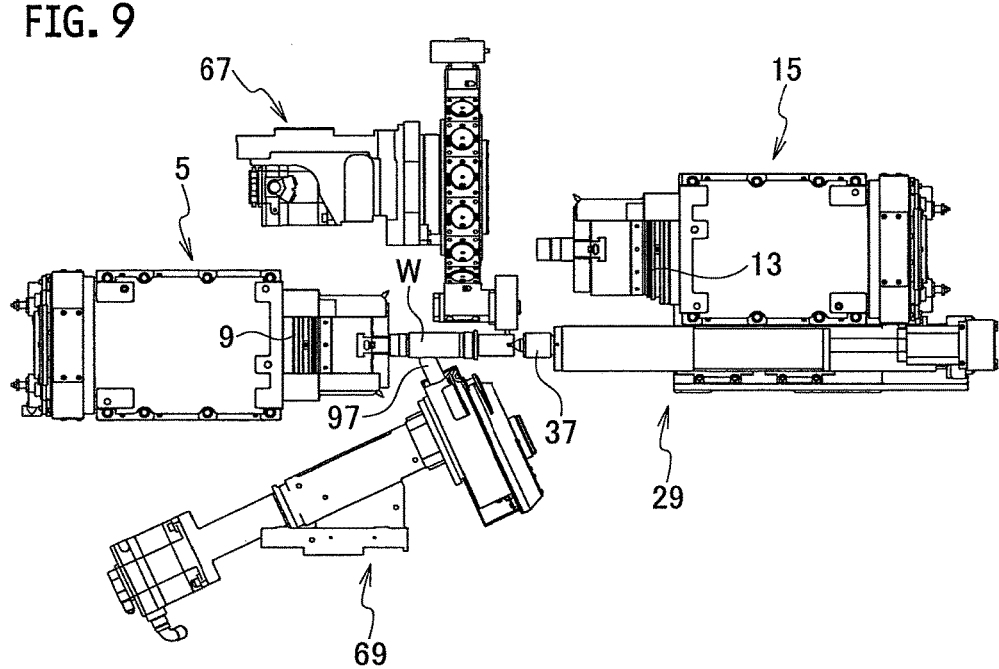
FIG. 9 It is a plan view showing a third mode of working on a workpiece by the work tool and working on the workpiece by the grinding wheel.

As shown in FIG. 9, it is possible to hold an base end of a workpiece W by the first main spindle 9 and support a distal end of the workpiece W by the center 37 of the tailstock 29. Then, the workpiece W can be worked by a tool of the tool head 67, and, concurrently, the workpiece W can be ground by the grinding wheel 97. Therefore, for example, since cutting by the tool of the tool head 67 and finishing (grinding) by the grinding wheel 97 can be carried out concurrently, working efficiency can be improved.

Figure 10:
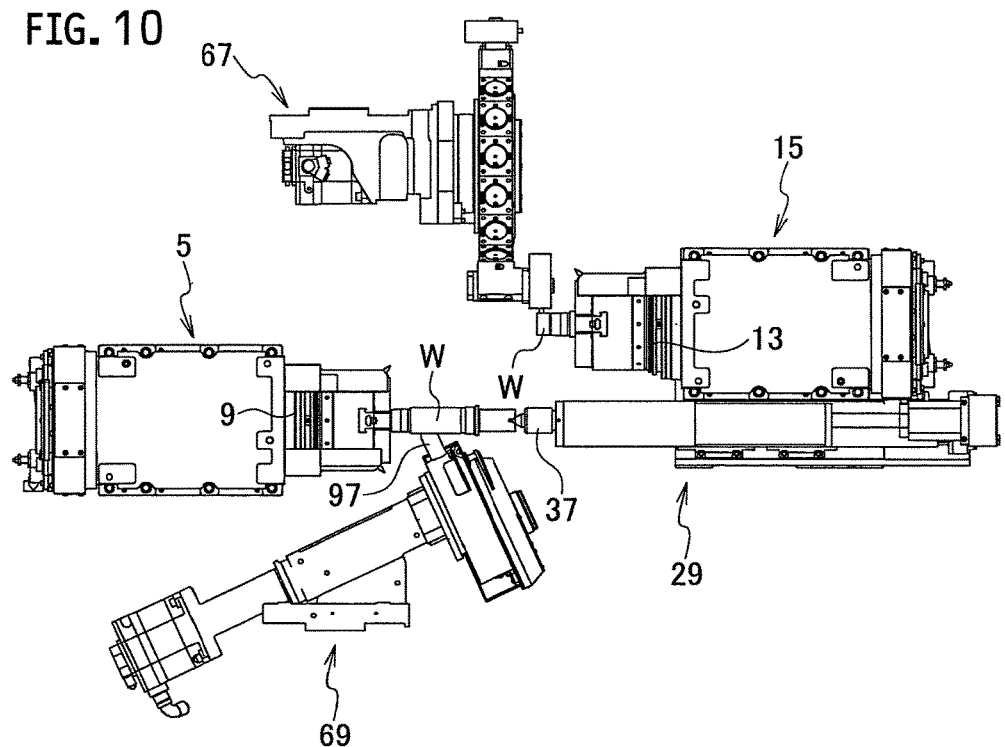
FIG. 10 It is a plan view showing a fourth mode of working on a workpiece by the work tool and working on a workpiece by the grinding wheel.

As shown in FIG. 10, it is possible to grind a workpiece W by the grinding wheel 97 while holding an base end of the workpiece W by the first main spindle 9 and supporting an distal end of the workpiece W by the center 37, and, concurrently, carry out working on another workpiece W by a work tool provided on the tool head 67 while holding the other workpiece W by the second main spindle 13. Therefore, since it becomes possible to carry out working on a long workpiece W and a short workpiece W concurrently, working efficiency for workpieces having different shapes or dimensions can be improved.

In addition, according to the present embodiment, a workpiece W held by the first main spindle 9 of the first headstock 5 can be set at a desired rotational position. Further, working by a tool of the tool head 67 and working by the grinding wheel 97 can be carried out concurrently. Therefore, as shown in FIG. 6, D-cuttings can be carried out concurrently by moving the tool attachment wheel 83 of the tool head 67 and the grinding head body 93 of the grinding head 69 along the Y-axis direction in a state where a rotation of a workpiece W is stopped by fixing a rotation of the first main spindle 9. Therefore, since flat portions D (see FIG. 6) facing opposing directions to each other can be formed on the workpiece W concurrently, working efficiency can be improved.

Furthermore, according to the present embodiment, since the sloped surface (installation surface) 3S of the base frame 3 is inclined by almost 75°, an upper portion of the sloped surface 3S is made closer to an operator. Therefore, attaching a tool on the tool attachment wheel 83 of the tool head 67 located at an upper position or removing a tool from the tool attachment wheel 83 can be done easily. In addition, a depth (a width along a direction indicated by an arrow A shown in FIG. 1) of the base frame 3 can be made small in view of a size of the installation surface 3S, and thereby space-saving can be achieved.

Figure 11:
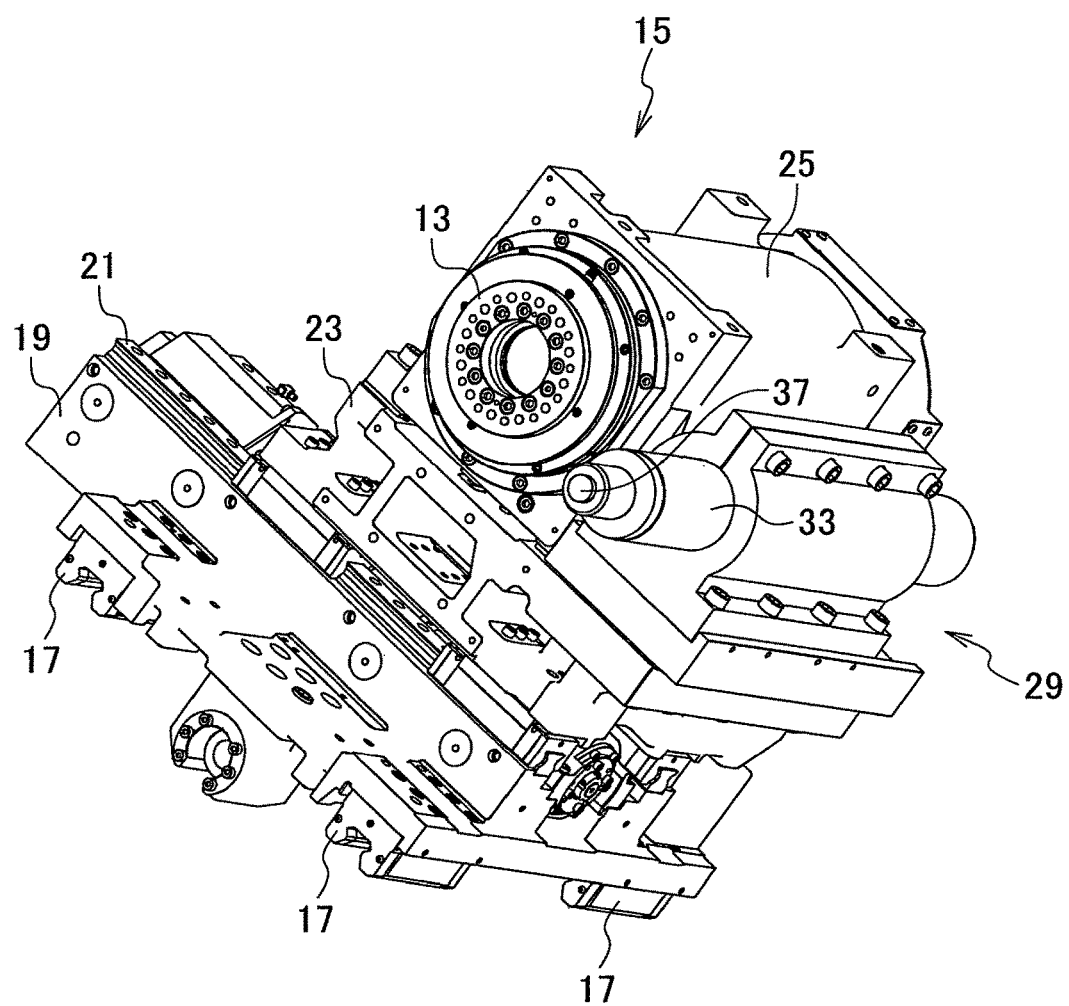
FIG. 11 It is an explanatory perspective view showing a modified example of the second headstock of the combined working machine.

Note that the present invention is not limited only to the above embodiment, and practicable in various embodiments. In addition, a claimed scope contained in the present invention is not limited to the above embodiment, either. For example, the quill 33 is provided on the tailstock 29 slidably in the Z-axis direction in the above embodiment (see FIG. 2). However, the quill 33 may be fixed with the tailstock 29 as shown in FIG. 11. But, also in this case, the second headstock 15 provided on the tailstock 29 is slidable in the Z-axis direction.

In addition, an inclined angle of the rotary shaft 95 of the grinding head 69, to the X-axis direction (or the Z-axis direction) in the X-Z plane, is fixed in the above embodiment. However, the grinding head 69 may be configured so that the inclined angle of the rotary shaft 95 of the grinding head 69, to the X-axis direction (or the Z-axis direction), can be adjusted in the X-Z plane. When it is configured in such a manner, an inclination of an outer circumferential surface of the grinding wheel 97 can be adjusted, and thereby the outer circumferential surface of the grinding wheel 97 can be matched with a tapered surface of a workpiece W. In this case, for example, the shaft support cylinder 99 may be configured so as to be movable relative to the grinding head body 93 in an axial direction of the rotary shaft 95.

The invention claimed is:

1. A combined working machine that can carry out cutting and grinding, the combined working machine comprising:
a base frame that has a sloped surface;
a first headstock that is installed on the sloped surface;
a first main spindle that is provided on the first headstock horizontally and rotatably, and holds a base end of a workpiece;
a second headstock that is installed on the sloped surface to be opposed to the first headstock;
a second main spindle that is provided on the second headstock movable in a Z-axis direction that is an axial direction of the first main spindle and an X-axis direction that is perpendicular to the Z-axis and parallel to the sloped surface, and is configured to hold a distal end of the workpiece or a base end of another workpiece;
a tool head that is installed on the sloped surface on one side of the first headstock;
a tool head body that is provided in the tool head movably in the X-axis direction and the Z-axis direction, and has a tool attachment base to which a cutting tool is attached exchangeably;
a grinding head that is installed on the sloped surface on another side of the first headstock;
a grinding head body that is provided in the grinding head movably in the X-axis direction and the Z-axis direction, and supports a rotary shaft that is rotatable and inclined to both of the X-axis direction and the Z-axis direction,
wherein
a grinding wheel for grinding is exchangeably attached to the rotary shaft of the grinding head; and
a dresser provided on the first headstock for dressing the grinding wheel,
wherein the first headstock has an outer circumferential surface that is centered on an axial center of the first main spindle,
the outer circumferential surface has a first portion and a second portion,
wherein, in a Y-axis direction that is perpendicular to both of the X-axis direction and the Z-axis direction, a distance from the sloped surface to the first portion is smaller than a distance from the sloped surface to the axial center of the first main spindle, and a distance from the sloped surface to the second portion is larger than the distance from the sloped surface to the axial center of the first main spindle,
the dresser is located outward from a chuck that is provided at one end of the first main spindle in the Z-axis direction with respect to the axial center of the first main spindle, and
the dresser is located only at the second portion among the first and second portions.

2. The combined working machine according to claim 1, wherein
the tool attachment base of the tool head is a tool attachment wheel, and
the tool attachment wheel is provided on the tool head body movably in the Y-axis direction that is perpendicular to both of the X-axis direction and the Z-axis direction.

3. The combined working machine according to claim 1, wherein
the second headstock includes a tailstock, and
the tailstock has a center piece that supports a distal end of the workpiece.

4. The combined working machine according to claim 3, wherein
the tailstock is movable in the Z-axis direction, and has a center holder to which the center piece is exchangeably attached,
the center holder has a push rod that is slidable in the Z-axis direction and pushes the center piece out from the center holder, and
the tailstock has an actuator that slides the push rod.

5. The combined working machine according to claim 1, further comprising: another dresser provided on the first headstock for dressing a grinding stone attached to the tool head.

6. The combined working machine according to claim 1, further comprising an additional dresser provided on the second headstock for dressing a grinding stone attached to the tool head.

7. The combined working machine according to claim 1, wherein
- the grind head body has a safety cover on which a cutout for exposing a portion of the grinding wheel is provided, and
- the safety cover has a shutter that closes the cutout.

8. A combined working method of a workpiece by using the combined working machine according to claim 1, comprising:
- cutting the workpiece held by the first main spindle by the cutting tool attached to the tool head, and,
- concurrently, grinding the workpiece by the grinding wheel.

* * * * *